No. 611,308. Patented Sept. 27, 1898.
W. WOODCOCK, J. LONGTHORPE & W. DARGUE.
MACHINE FOR DYEING, SIZING, AND WASHING YARN.
(Application filed Jan. 18, 1898.)
(No Model.) 6 Sheets—Sheet 5.
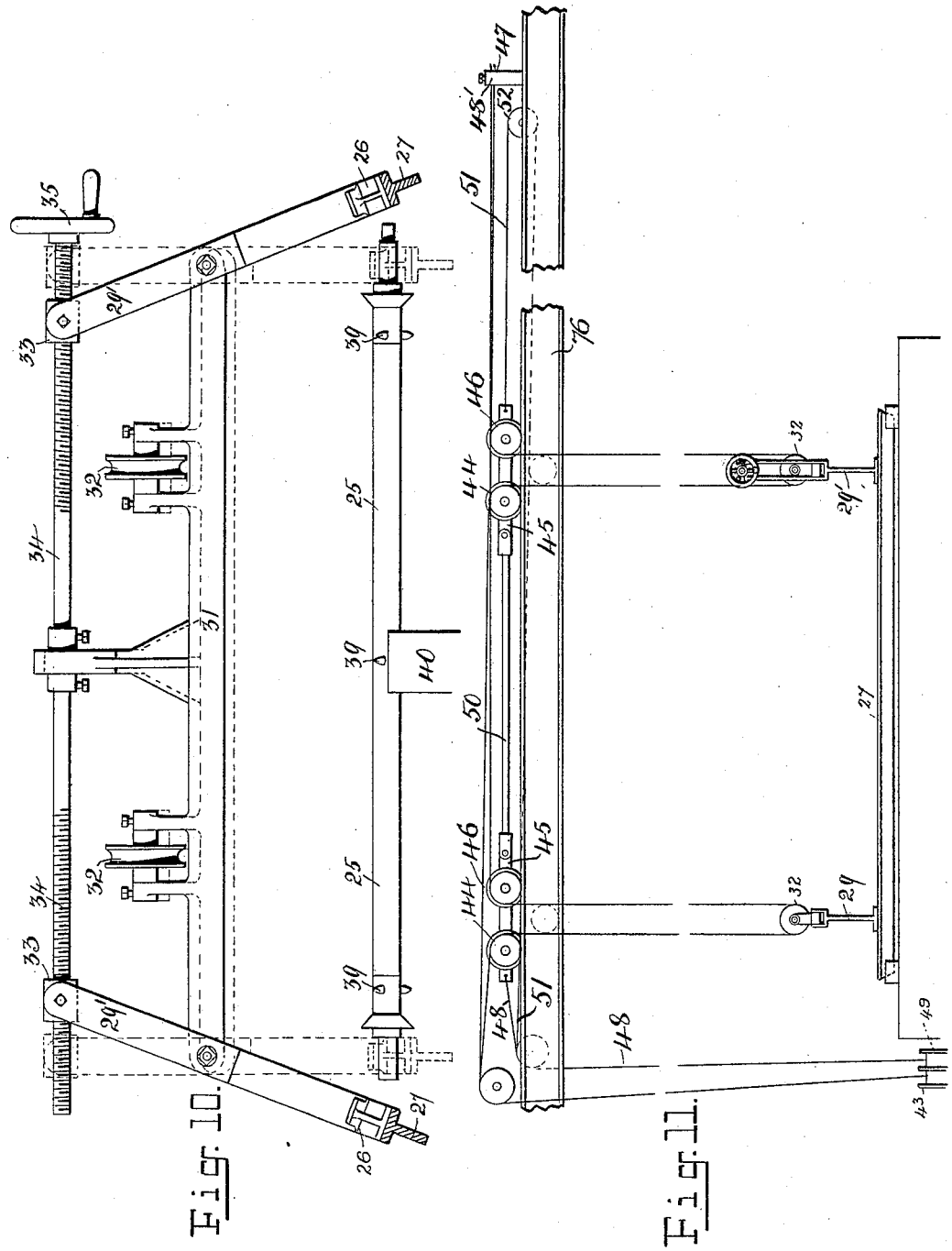

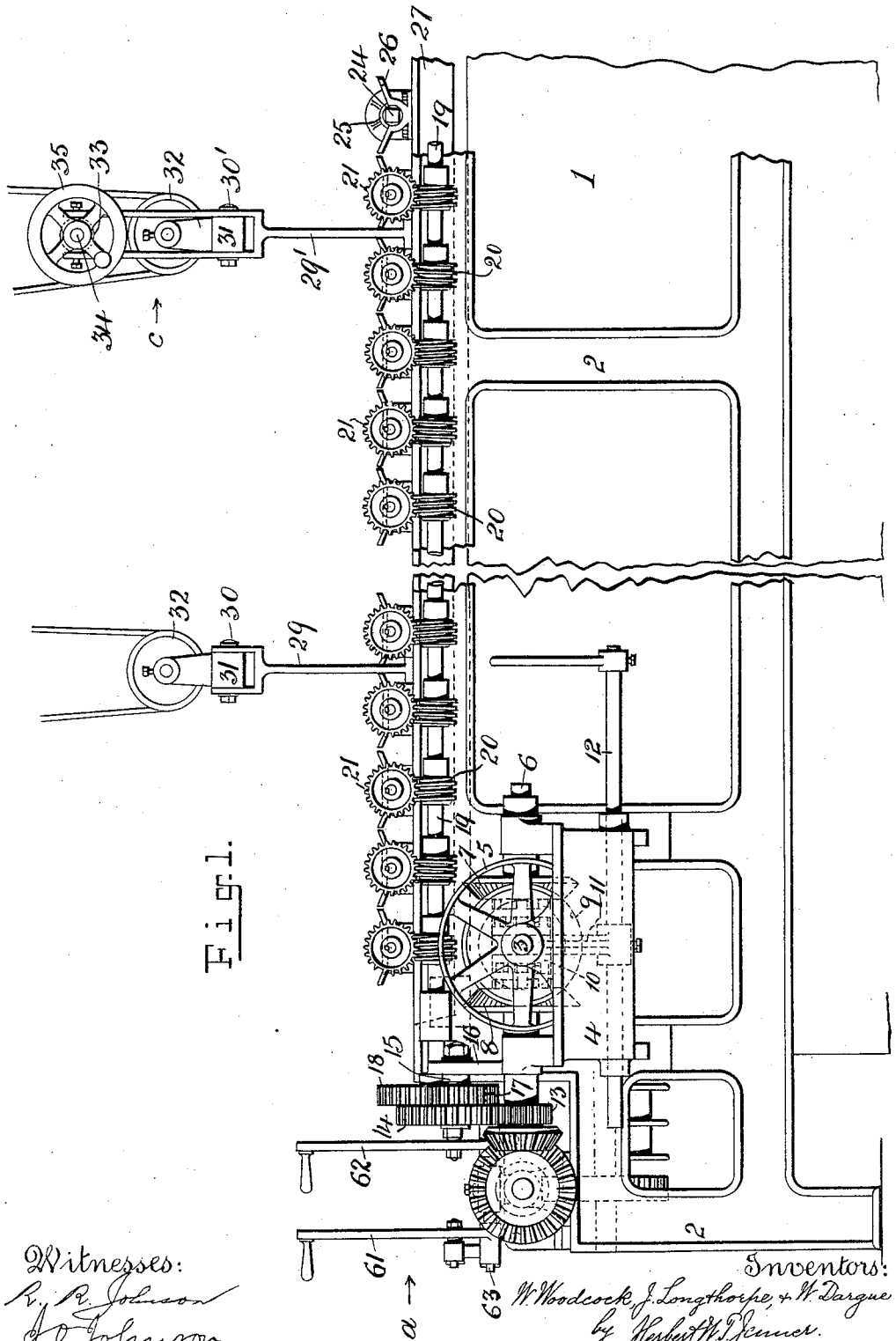

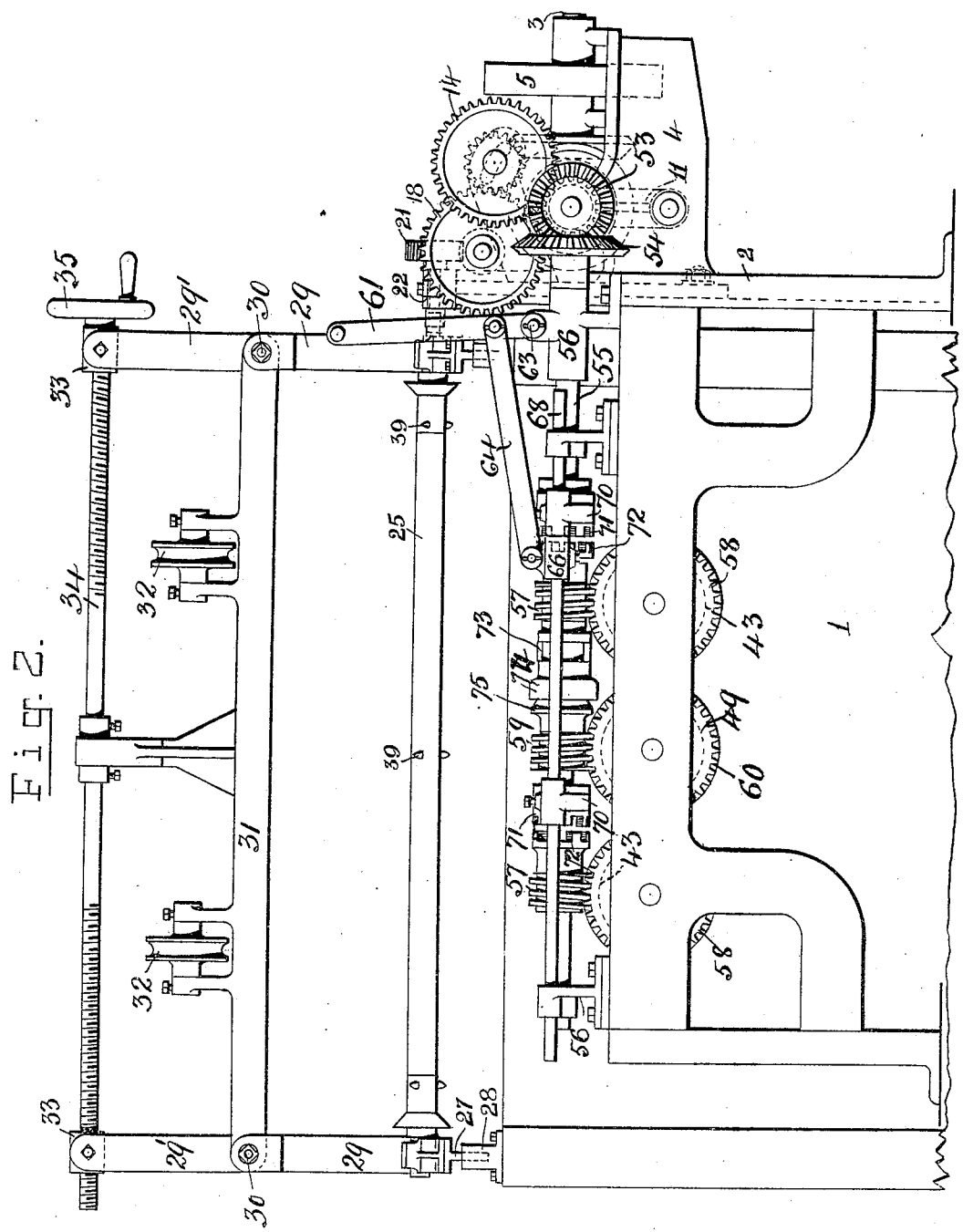

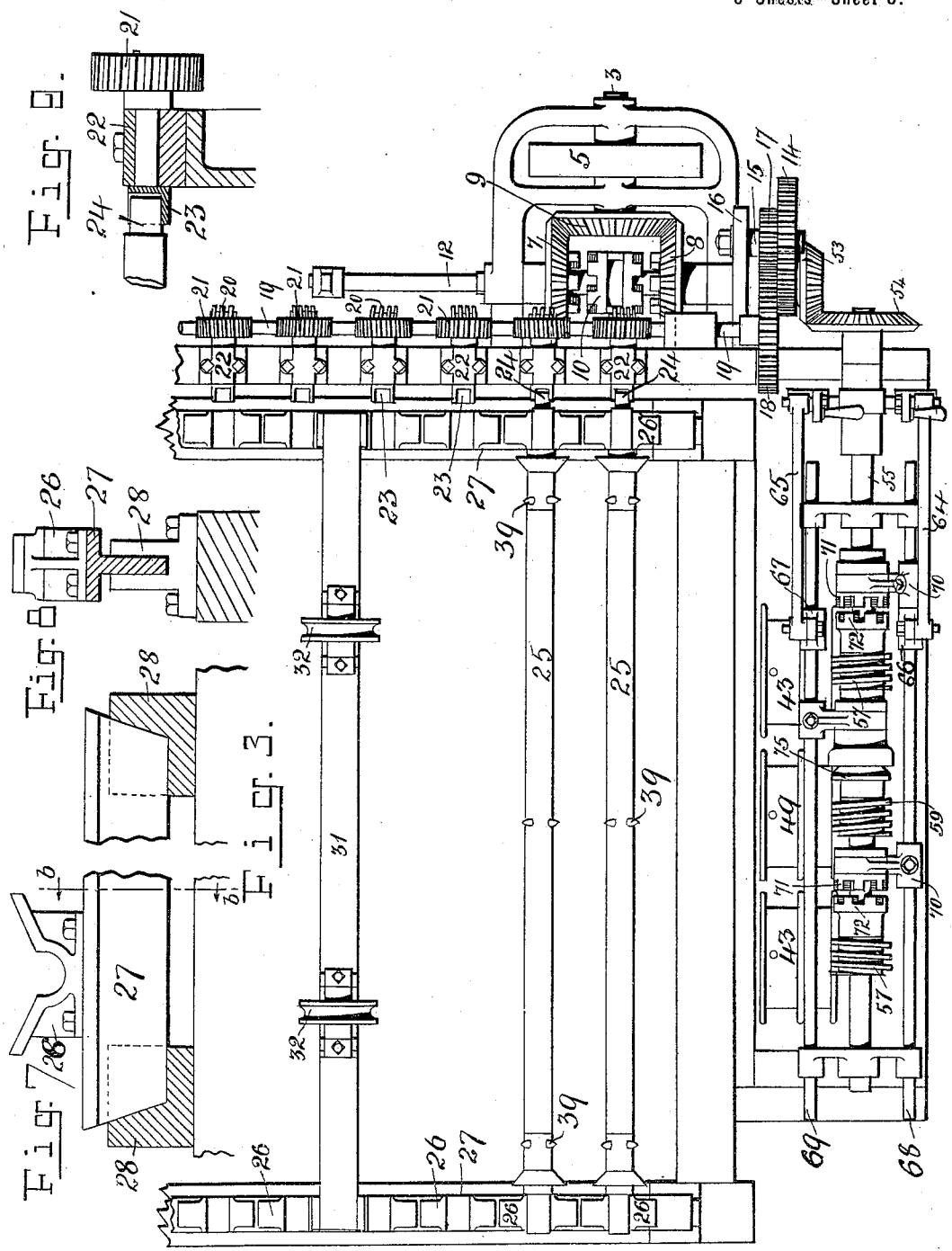

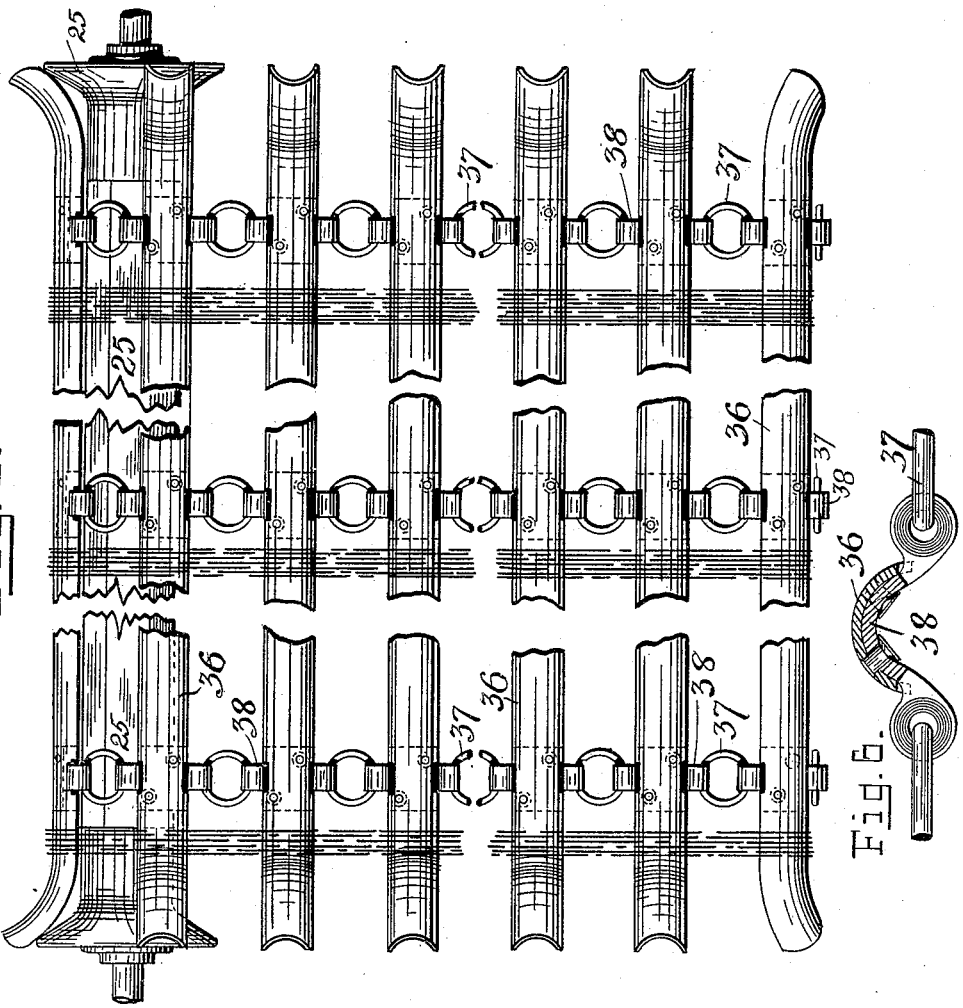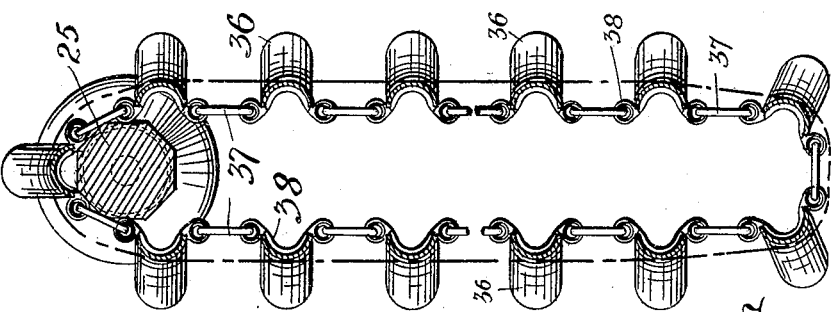

No. 611,308. Patented Sept. 27, 1898.
W. WOODCOCK, J. LONGTHORPE & W. DARGUE.
MACHINE FOR DYEING, SIZING, AND WASHING YARN.
(Application filed Jan. 18, 1898.)
(No Model.) 6 Sheets—Sheet 6.
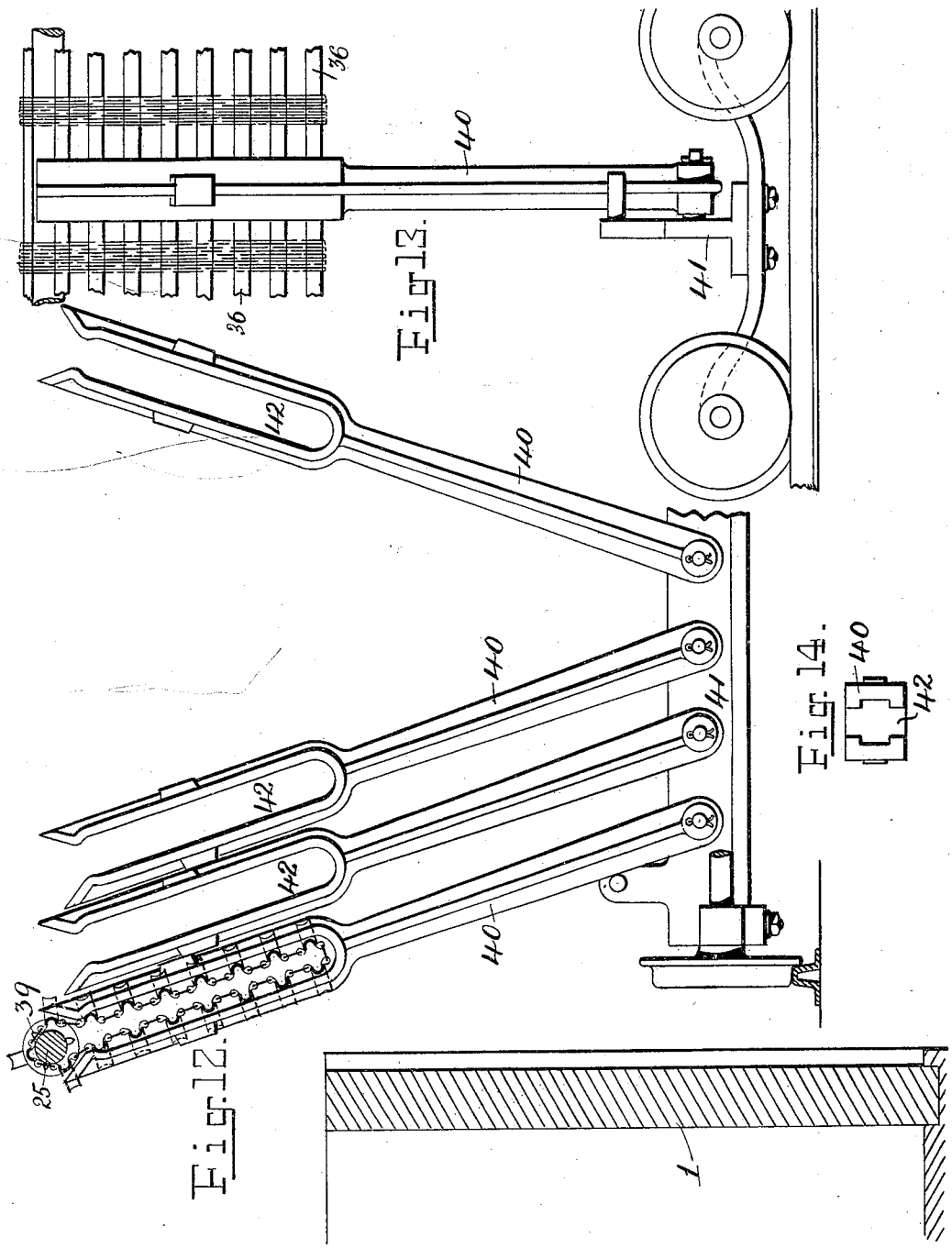
Witnesses:
Inventors:

UNITED STATES PATENT OFFICE.

WRIGHT WOODCOCK, JESHURUN LONGTHORPE, AND WALTER DARGUE, OF COPLEY, ENGLAND.

MACHINE FOR DYEING, SIZING, AND WASHING YARN.

SPECIFICATION forming part of Letters Patent No. 611,308, dated September 27, 1898.

Application filed January 18, 1898. Serial No. 667,080. (No model.)

*To all whom it may concern:*

Be it known that we, WRIGHT WOODCOCK, JESHURUN LONGTHORPE, and WALTER DARGUE, subjects of the Queen of Great Britain, residing at Copley, in the county of York, England, have invented certain new and useful Improvements in Machinery for Dyeing, Sizing, and Washing Hanks of Yarn and Slubbing; and we do hereby declare the following to be a full, clear, and exact description of the invention, such as will enable others skilled in the art to which it appertains to make and use the same.

This invention relates to an apparatus for dyeing, sizing, and washing hanks of yarn and slubbing.

The object of our invention is to construct and arrange machinery or apparatus for revolving or traversing hanks of yarn or slubbing through the liquid contained in the dyeing, sizing, or washing cistern, and to employ in conjunction with said machinery means for expediting the charging of the hank-carrying rollers with hanks and the discharging of same when the operation of dyeing, sizing, or washing is completed.

To the aforesaid purpose our invention consists in the novel and peculiar arrangement of parts, as hereinafter fully described in the accompanying drawings, illustrating our invention.

Figure 1 is a side elevation of so much of a hank or slubbing, dyeing, sizing, or washing machine as is essential to show the application of our improvements. Fig. 2 is an end elevation looking in the direction of arrow *a*, Fig. 1. Fig. 3 is a plan view of part of Fig. 1. Fig. 4 is a cross-section of the hank-carrying roller and endless chain of cross-bars. Fig. 5 is a transverse elevation of Fig. 4. Fig. 6 is an enlarged cross-section of cross-bar and chain-link. Fig. 7 is a detail of one of the lifter-rails, showing the end pockets in which the same registers, and is supported on the top of the cistern. Fig. 8 is a transverse section of same, taken on line *b b* of Fig. 7. Fig. 9 is a detail of the means for engaging and driving the hank-carrying rollers. Fig. 10 is a transverse elevation of one of the hinged frames carrying the lifter-rails, looking in the direction of arrow *c*, Fig. 1, showing the means for and method of releasing the hank-carrying rollers. Fig. 11 is an elevation, on a reduced scale, of the arrangement of the ropes for lowering, raising, and traversing the lifter-rails into, out of, and over or away from the cistern or dye vessel. Fig. 12 is an elevation showing a few of the hinged frames at the end of the dye vessel for receiving the series of endless chains of cross-bars and hank-carrying rollers to enable same to be charged with hanks or to be stripped thereof prior to or after the dyeing, sizing, or washing operation. Fig. 13 is an end elevation of Fig. 12. Fig. 14 is a plan view of one of the hinged frames shown in Fig. 12.

The same figures of reference indicate corresponding parts throughout.

Referring to the drawings, 1 represents the dye cistern or vessel, (or it may be the sizing or washing cistern) 2, the framework built up on the near side and left-hand end of the cistern for carrying the motor mechanism; 3, the main driving-shaft, journaled in bearings in the bracket 4 and driven by strap passing around the pulley 5.

6 is a shaft arranged at right angles to the main driving-shaft and journaled in bearings in the bracket 4, said shaft 6 having two bevel-gears 7 and 8, mounted loosely thereon, with which meshes a bevel-gear 9, fast on the shaft 3. Intermediate of the gears 7 and 8 and secured rotatively to the shaft 6 by a key is a double clutch 10, which when slid to right or to left by fork 11, which is attached to a rod 12, as shown, is adapted to engage with one or other of opposing clutches on the faces of the bevel-gears 7 or 8, and thus give motion to the shaft 6 either in one direction or the other, as is required. On the end of shaft 6 is a pinion 13, gearing with a spur-wheel 14 on a stud-shaft 15, secured in a bracket 16, bolted to the framework 2, a pinion 17 on said stud-shaft gearing with a spur-wheel 18, fast on a worm-shaft 19, extending the whole length of the machine and having right and left hand worms 20 secured alternately thereto. In mesh with the worms 20 are worm-wheels 21, journaled in brackets 22, Fig. 9, bolted to the top of the framework 2, the inner ends of the studs on which said wheels are secured terminating in square-sided sockets 23, (see Figs. 3 and 9,) which are adapted to register, when in position, with the square ends 24 of the hank-carrying rollers 25, which are thus engaged by the sockets and rotate therewith.

The hank-carrying rollers are placed loosely in open bearings in brackets 26, secured to the two side lifter-rails 27, which rest at each end in pockets 28, Figs. 7 and 8, secured to the top longitudinal edges of the cistern or vessel 1. To the lifter-rails are secured brackets 29 29', whereto are hinged at 30 30' cross or transverse bars 31, carrying grooved pulleys 32, arranged one near each side of the cistern. The brackets 29' are continued to a higher level than the brackets 29, and between the upper ends thereof are centered nuts 33, through which when rotated by hand-wheel 35 the right and left handed screwed ends of a shaft 34 work and cause the brackets 29 29' to move on their centers 30 30' outwardly from the vertical or from the angular to the vertical, as illustrated in Fig. 10, the movement outwardly to the position shown in full line in Fig. 10 carrying the lifter-rails 27 and the brackets 26 clear of the two opposite ends of the hank-carrying rollers, so that the hanks can be easily and expeditiously removed from same and a fresh supply placed thereon, this being done when the lifter-rails and parts connected therewith have been traversed away from the cistern 1. When the rollers have been recharged with hanks, the brackets 26 and lifter-rails 27 are brought back again to the normal position, (shown in dotted line in Fig. 10,) and, passing under the ends of the hank-carrying rollers, the latter by reason of the inclined surfaces at each side of the brackets are caused to fall into their respective bearings. The hank-rollers 25 carry endless chains of transverse bars or laths 36 of half-round section, which are connected to each other at each end and in the center of the bars by links 37, passing through openings in other links 38, to which the bars or laths are riveted. (See Fig. 6.) These endless chains of cross-bars are turned or curved upwardly at the ends to prevent the hanks slipping off and are approximately the length of the longest hank treated in the class of machine to which this invention refers, and they are collapsible to any extent to suit the various sizes of hanks which may require treatment in the machine, the weight of the chains serving to keep the hanks in a thoroughly-distended state. The rollers may be hexagonal, as in Fig. 4, or round, as shown in the other figures, the latter being preferred. In either case small studs 39 may be secured to the periphery of each roller to take into the links 37, so that the chains will be traversed around the rollers positively.

When charging the rollers 25 with hanks, they are placed each in separate hinged frames 40, carried on a carriage 41, adapted to travel transversely of the cistern, so that it can be run from one cistern to another alongside it and thus serve for any number of cisterns (if required) arranged side by side. The middle of the rollers 25 rests on the upper ends of the said frames and the endless chains descend into the openings 42, as shown at Fig. 12, so that the endless chains of bars are unobstructed on either side of the frames and admit of the hanks being passed on or drawn off by the workman without difficulty, there being the space left in the middle where the frames support them to divide the hanks on one side from those on the other, whereby when dyed and brought back again the endless chains of bars will pass into the openings 42 without carrying the adjacent hanks into same. After charging endless chains whose collapsed condition in the openings 42 admits of the hanks being passed over same without stretching or extending them the lifter-rails 27 and brackets 26 are brought to the vertical position, as before explained, and the rollers 25, journaled in the bearings in said brackets, whereupon the whole is then raised by means of a double system of wire ropes attached to winding and unwinding barrels 43 and passing around pulleys 44 on overhead traveling carriages 45, Fig. 11, then under the pulleys 32 and over other pulleys 46 on said carriages 45, and secured at 47 to a bracket 48'. When raised to a height to clear the frames 40, the whole is traversed forward over the machine by a wire rope 48, attached at one end to a barrel 49 and at the opposite end to the near carriage, both carriages being connected together by a rod or link 50. The lifter-rails and parts are traversed backward or in a reverse direction away from the machine by a second wire rope 51, connected at one end to the barrel 49 and passed around a pulley 52 and attached to the rear carriage, as shown at Fig. 11.

On arriving in position over the cistern the hanks carrying rollers and parts are lowered until the lifter-rails bed themselves in the pockets 28, the square ends 24 of the hank-carrying rollers at the same time entering the square sockets 23 on the ends of the studs carrying the worm-wheels, whose motion is timed to bring the open sides of all said sockets uppermost, so that all are in position to receive the square ends 24 of the hank-carrying rollers. Motion is now given to the machine by sliding the clutch-box 10 into gear with one or other of the bevel-wheels 7 or 8, the right and left hand worms giving motion in opposite directions to the hank-carrying rollers, which traverse the endless chains and hanks through the liquor in the cistern 1. To reverse the motions of the parts, the clutch-box 10 is moved out of gear with the bevel-wheel it has been engaged with into gear with the second bevel-wheel, as will be understood.

The motion for driving the barrels 43 and 49 is derived from the shaft 6 through the medium of a bevel-gear 53 on the end of said shaft, meshing with a bevel-wheel 54 on a shaft 55, journaled in bearings 56 on the end frame of the machine. Mounted loosely on said shaft 55 are two worms 57, one right hand and the other left hand, into which mesh toothed wheels 58 on the axes of the barrels 43. A third worm 59 is also mounted loosely on the shaft 55, which gears with a toothed wheel 60 on the axis of the barrel 49.

61 and 62 are levers centered at 63, to which are connected rods 64 65, attached at their opposite ends to bosses 66 and 67, respectively, secured to slide-rods 68 and 69, supported in brackets at each end. To the slide-rods 68 are secured two clutch-forks 70 70, engaging with clutches 71 71, which are secured rotatively to the shaft 55, but can be slid thereon into and out of gear with opposing clutches 72 72, forming part of the worms 57, which can thus be set in motion or stopped by moving the lever 61 to the left or right. When said lever is moved to the left, the clutches are placed in gear, and motion is thus given to the barrels 43 for the purpose of raising or lowering the lifter-rails and parts. By moving the lever 62 to the left the slide-rod 69 is slid endwise, a clutch-fork 73 thereon sliding a hollow friction-clutch 74 into engagement with a friction-cone 75, whereby the worm 59 is driven and gives motion to the barrel 49, which traverses the carriages 45 backward and forward on the girder 76, therefore carrying the lifter-rails and parts over or away from the machine, the requisite direction of motion of the parts for the aforesaid purposes being given by the direction of motion of the shaft 6.

We claim as our invention—

1. The combination with a roller, endless chains normally suspended from the roller, the links of said chains having play longitudinally at their joints, and bars secured transversely to the said chains; of means for pushing together the links of the said chains, thereby permitting hanks of yarn to be slipped onto the said bars, substantially as set forth.

2. The combination, with a roller, endless chains normally suspended from the said roller, the links of the said chains having play longitudinally at their joints, and bars concavo-convex in cross-section and secured to the chains with their convex sides outward; of means for pushing together the links of the said chains, thereby permitting hanks of yarn to be slipped onto the said bars, substantially as set forth.

3. The combination, with a roller, endless chains normally suspended from the said roller, said chains being formed of plates having eyes arranged crosswise of them at their ends, and links connecting the adjacent eyes and having play longitudinally in them, and bars secured to the said plates; of means for pushing together the said eyes and links, thereby permitting hanks of yarn to be slipped onto the said bars, substantially as set forth.

4. The combination, with a series of stationary bearings, a series of shafts journaled in the said bearings and provided with angular sockets having openings on one side, said shafts being arranged so that all the said openings come uppermost simultaneously, and driving mechanism positively connecting the said shafts; of a series of removable rollers provided with angular end portions for engaging with the said sockets, and bearings for supporting the said rollers, substantially as set forth.

5. The combination, with a roller, of a bar arranged over the said roller, brackets carried by the said bar, bearings for the said roller carried by the said brackets, lifting mechanism supporting the said bar and brackets, and means for moving the said bearings apart, thereby releasing the said roller, substantially as set forth.

6. The combination, with a roller, of a bar arranged over the said roller, brackets having their middle portions pivoted to the said bar, bearings for the said roller connected with the lower parts of the said brackets, and means for moving apart the said bearings, said means being connected to the upper parts of the said brackets, substantially as set forth.

7. The combination, with a series of rollers, and lifter-rails provided with bearings for said rollers; of bars arranged crosswise over the said rails, brackets carried by the said bars and supporting the said rails, lifting mechanism connected to the said bars, and means for moving apart the said rails together with the said bearings, substantially as set forth.

8. The combination, with a tank, rollers arranged crosswise of the tank, and collapsible supports for hanks of yarn depending from the said rollers; of a carriage running outside the said tank longitudinally of the said rollers, and frames supported by the said carriage and provided with openings in which the said supports are collapsed when lowered so as to be partially supported by the said frames, substantially as set forth.

9. The combination, with a tank, rollers arranged crosswise of the tank, and collapsible supports for hanks of yarn depending from the said rollers; of a carriage running outside the said tank longitudinally of the said rollers, and frames pivoted to the said carriage and movable crosswise of the said rollers, said frames being provided with openings in which the said supports are collapsed when lowered so as to be partially supported by the said frames, substantially as set forth.

10. In a hank dyeing, sizing, or washing machine the combination with hank-carrying rollers of endless chains of bars or laths attached together by links and adapted to be traversed around said rollers when rotated, lifter-rails adapted to enter and rest in pockets secured to the top of the cistern, brackets with inclined faces attached to said lifter-rails, and provided with bearings for receiving the hank-carrying rollers, uprights secured to the lifter-rails to which cross-bars are centered, a right and left handed screw adapted, when rotated to work through nuts centered to one pair of said uprights and to move the uprights about the studs on which the cross-bars are centered to place the lifter-rails and bearings clear of the hank-carrying rollers or the reverse, the right and left handed worm and worm-wheel gearing for driving said hank-carrying rollers, square-sided sockets on the inner ends of the worm-wheel studs, square ends on the hank-carrying rollers adapted to engage in said sockets for rotating the said rollers, and the motor mechanism for giving motion to the worm-shaft, substantially as set forth.

11. In a hank dyeing, sizing, or washing machine, the combination with hank-carrying rollers, endless chains of bars or laths attached together by links and adapted to be traversed around said rollers when rotated, lifter-rails adapted to enter and rest in pockets secured to the top of the cistern, brackets with inclined faces attached to said lifter-rails and provided with bearings for receiving the hank-carrying rollers, uprights secured to the lifter-rails to which cross-bars are centered, a right and left handed screw adapted, when rotated, to work through nuts centered to one pair of said uprights and to move the uprights about the studs on which the cross-bars are centered to place the lifter-rails and bearings clear of the hank-carrying rollers or the reverse, the right and left handed worm and worm-wheel gearing for driving said hank-carrying rollers, square-sided sockets on the inner ends of the worm-wheel studs, square ends on the hank-carrying rollers adapted to engage in said sockets for rotating the said rollers, and the motor mechanism for giving motion to the worm-shaft, of the motor mechanism for raising and lowering the lifter-rails and parts and traversing them backward and forward over or away from the machine, and the arrangement of wire ropes for lifting, lowering and traversing the said parts substantially as set forth.

In testimony whereof we affix our signatures in presence of two witnesses.

WRIGHT WOODCOCK.
JESHURUN LONGTHORPE.
WALTER DARGUE.

Witnesses:
ALBERT LEAROYD,
FRANK LEWIN.